United States Patent
Vanhentenrijk et al.

(10) Patent No.: US 9,368,952 B2
(45) Date of Patent: Jun. 14, 2016

(54) GEL SEALING DEVICE

(75) Inventors: Robert Vanhentenrijk, Winksele (BE); Ronnie Rosa Georges Liefsoens, Tessenderlo (BE); Pieter De Coster, Bekkevoort (BE)

(73) Assignee: CommScope Connectivity Belgium BVBA (BE)

( * ) Notice: Subject to any disclaimer, the term of this patent is extended or adjusted under 35 U.S.C. 154(b) by 853 days.

(21) Appl. No.: 13/513,106

(22) PCT Filed: Nov. 25, 2010

(86) PCT No.: PCT/EP2010/068236
§ 371 (c)(1),
(2), (4) Date: May 31, 2012

(87) PCT Pub. No.: WO2011/067163
PCT Pub. Date: Jun. 9, 2011

(65) Prior Publication Data
US 2012/0235363 A1    Sep. 20, 2012

(30) Foreign Application Priority Data
Dec. 3, 2009  (EP) .................................... 09015000

(51) Int. Cl.
*H02G 15/013*  (2006.01)
*H02G 15/076*  (2006.01)
(Continued)

(52) U.S. Cl.
CPC ............ *H02G 15/013* (2013.01); *G02B 6/4444* (2013.01); *G02B 6/4471* (2013.01); *H02G 15/076* (2013.01); *H02G 15/117* (2013.01)

(58) Field of Classification Search
CPC ..... H02G 15/013; H02G 3/22; H02G 3/0666; G02B 6/4444
See application file for complete search history.

(56) References Cited

U.S. PATENT DOCUMENTS 5,425,171 A * 6/1995 Kroger et al. .................... 29/876
5,745,633 A * 4/1998 Giebel et al. ................... 385/136
(Continued)

FOREIGN PATENT DOCUMENTS

EP    0 681 598 B1    11/1995
EP    0 426 658 B1    11/1996
(Continued)

OTHER PUBLICATIONS

European Search Report for EP Application No. 09 01 5000 mailed May 11, 2010.

*Primary Examiner* — Kristina Fulton
*Assistant Examiner* — Nicholas L Foster
(74) *Attorney, Agent, or Firm* — Merchant & Gould P.C.

(57) ABSTRACT

The present invention relates to a gel sealing device for sealing a passage of elongate parts through an opening. Such gel sealing device is preferably arranged in a housing used in telecommunication technology. The inventive gel sealing device comprises a gel sealing block (5) which provides a sealing section (22) through which the elongate parts (13) extend, wherein the gel sealing block (5) comprises an upper flange (11) and a lower flange (12) with a support section (11a, 12a, 12b) disposed therebetween. The upper and lower flanges (11, 12) sandwiches in direction of extension of the elongate parts (13), a gel inner ring (7) supported by said support section (2) and a gel outer ring (6, 10a) covering the gel inner ring (7) in a radial direction extending transverse to said extension direction. The gel inner ring (7) and the gel outer ring (6, 10a) are made of a gel sealing material, wherein the sealing section (22) is formed therebetween. The gel sealing block (5) is adapted to seal in the sealing section (22) a tube end of at least one tube (14) guiding at least one of the elongate parts.

14 Claims, 10 Drawing Sheets

(51) Int. Cl.
*H02G 15/117* (2006.01)
*G02B 6/44* (2006.01)

(56) References Cited

U.S. PATENT DOCUMENTS

| | | | | |
|---|---|---|---|---|
| 5,758,004 | A | * | 5/1998 | Alarcon et al. ............... 385/135 |
| 5,764,844 | A | * | 6/1998 | Mendes ........................ 385/135 |
| 5,775,702 | A | * | 7/1998 | Laeremans et al. ........... 277/314 |
| 5,903,693 | A | | 5/1999 | Brown |
| 6,150,608 | A | * | 11/2000 | Wambeke et al. ............ 174/652 |
| 7,015,394 | B2 | * | 3/2006 | Desard et al. ................. 174/100 |
| 7,461,983 | B1 | | 12/2008 | Gurreri et al. |
| 2004/0100028 | A1 | * | 5/2004 | Desard et al. ................. 277/314 |
| 2009/0309313 | A1 | | 12/2009 | Knorr et al. |
| 2012/0298417 | A1 | * | 11/2012 | Kempeneers et al. ...... 174/77 R |
| 2013/0020771 | A1 | * | 1/2013 | Vanhentenrijk et al. ....... 277/605 |

FOREIGN PATENT DOCUMENTS

| | | |
|---|---|---|
| EP | 2 365 367 | 5/2010 |
| GB | 2 421 641 | 6/2006 |
| WO | WO 97/42693 | 11/1997 |
| WO | WO 2005/027290 A1 | 3/2005 |
| WO | WO 2007/118548 A1 | 10/2007 |

\* cited by examiner

GEL SEALING DEVICE

This application is a National Stage Application of PCT/EP2010/068236, filed 25 Nov. 2010, which claims benefit of Serial No. 09015000.4, filed 3 Dec. 2009 in Europe and which applications are incorporated herein by reference. To the extent appropriate, a claim of priority is made to each of the above disclosed applications.

BACKGROUND

The present invention relates to a gel sealing device for sealing a passage of elongate parts through an opening. The gel sealing device provides a sealing section through which the elongate parts extends, wherein the gel sealing device comprises a gel sealing block having an upper flange and a lower flange with a support section disposed therebetween for supporting a gel ring sandwiched between the flanges in direction of extension of the elongate parts and which forms the sealing section.

Such a gel sealing device is e.g. known from WO 2005/027290 A1, which finds particular application in the field of telecommunications technology to which the present invention also preferably relates.

The known gel sealing device is accommodated in a lower housing body which is connectable to an upper housing body which forms a cable organizing area and is provided with a foldable gel ring comprising two semicircular gel ring segments which abut against each other in a radial inner area of the gel sealing device to form a common sealing section therebetween through which a plurality of cables extends. Conventionally, the plurality of cables comprises at least one cable from a provider site and at least one cable ranging to a customer site, e.g. a dwelling unit, wherein said provider cable and said customer cable are spliced within the organising area provided in an area of the upper housing body in which the splicing is sealed against environmental influences. The provider cable denoting a main cable may comprise one or more signal transmitting elements, such as an optical fibre element or a metal wire element, which is at last surrounded by an outer jacket protecting said element. The customer cable normally comprises an optical fibre element or a metal wire element to be spliced with the assigned element of the main cable in the organizing area of the upper housing body, wherein said optical fibre element or metal wire element is also protected by an outer jacket or a tube as e.g. used in blown fibre application.

Conventionally, the jacket or tube extends through the sealing section and is retained in the organizing area, wherein the optical fibre element or metal wire element guided by said jacket or tube is completely exposed in the organizing area by completely removing the respective part of the jacket in the organizing area or by providing the tube with its tube end in said organizing area, respectively. That is, the jacket or tube forms a jacket or tube end in the organizing area, wherein said jacket/tube end needs to be sealed by a gel sealing member covering and sealing the jacket/tube end in both axial directions thereof. In other words, each customer cable ending in the organizing area and provided to be spliced with the assigned element of the main cable, needs to be sealed with the gel sealing member at the jacket/tube end. Accordingly, the installation of the cables is time-consuming. Furthermore, as the customer cables normally extend through the sealing section in the form of bundles, care needs to be taken, at the time of handling one of said cables for e.g. a splice operation, for the cables of the bundles not to be handled in order to prevent damage to said cables.

SUMMARY

It is an object of the present invention to provide a gel sealing device with improved sealing property for simplifying assembling of the gel sealing device and for reducing an installation time of parts to be sealed.

The present invention is based on the concept that the gel sealing device, comprising a gel sealing block with a gel inner ring and a gel outer ring covering said gel inner ring and forming a sealing section therebetween, is adapted to seal in said sealing section a tube end of at least one tube guiding at least one elongate part. As the present invention finds preferably application in the field of telecommunication technology, an elongate part is constituted by a commonly known cable which protects a signal transmitting element such as an optical fibre element or a metal wire element as described above. Based on said explanation, a tube refers preferably to any means suitable for protecting and guiding the signal transmitting element. The tube end denotes the axial end of the tube in its direction of extension. The gel outer ring and the gel inner ring are made of a gel sealing material commonly known for cable housing used in the technical field of telecommunication technology.

This gel sealing material is a highly viscous liquid which can be regarded as a pseudo plastic or non-Newtonian fluid (cp. EP 0 426 658 B1 and EP 0 681 598 B1). In other words, the gel sealing material has the capability of being deformable to adopt as a negative pattern, the contours of the surfaces of the parts surrounding the gel sealing material, particularly of the upper and lower flanges and of a housing body accommodating the gel sealing device, provided for contacting the gel sealing material to perform sealing and for supporting axially and radially the gel outer ring and the gel inner ring. Furthermore, as the gel inner ring is also made of such a gel sealing material, the portion of the elongate parts, which are preferably constituted by a plurality of cables extending between the gel outer ring and the gel inner ring will be fully surrounded, i.e. encapsulated in its circumferential direction by the gel sealing material. Accordingly, the gel sealing material will flow and will be pressed towards the contact surfaces provided with the housing for the gel sealing material by exerting a predetermined pressure onto said gel sealing material, wherein a sealing is obtained therebetween. Said pressure can be preferably achieved by dimensioning the gel outer ring and/or gel inner ring larger than a space provided in the gel sealing device for supporting the gel outer and inner rings, respectively. Alternatively, or in addition thereto, the gel sealing device is preferably adapted to compress the gel outer and inner rings with respect to each other, preferably by moving at least the upper flange or the lower flange towards the other flange.

By ending the tube in the sealing section of the gel sealing device, no further gel sealing members are required additionally to the gel sealing device. Further, the sealing section formed by the gel inner ring and the gel outer ring can be used for the tube ends, wherein the tube ends can be disposed adjacently to each other in circumferential direction of the gel sealing device. Preferably, the tube ends are disposed in a central portion of the sealing section to ensure a reliable sealing thereof.

In a preferred embodiment of the present invention, the sealing section provides a termination which is adapted to abut against the tube end in the extension direction of the tube and which is adapted to let pass the elongate part guided by the tube and protruding from the tube end. Preferably, the termination is formed at least by the outer circumferential surface of the gel inner ring or by the inner circumferential surface of the gel outer ring. Particularly, the respective circumferential surface of the gel inner ring and the gel outer ring comprises a groove for receiving an end part of the tube, wherein the groove extends from an axial end side of the gel inner ring or of the gel outer ring, respectively, into the sealing section and forms with its axial end side in the sealing section an abutment shoulder against which an axial end side of the tube end abuts in a tube receiving state. The tube can be thereby axially retained in one axial direction. More preferably, the groove has a depth corresponding to a thickness of the tube material surrounding the passage for the elongate part guided by the tube. Thereby, the elongate part can protrude from the tube end without interference caused by the termination. Additionally, the elongate part can be supported and guided by the portion of the respective gel inner and outer ring following in axial direction of the groove after the termination after leaving the tube end.

To facilitate a further reliable alignment of the tube end in the sealing section, the gel sealing device preferably comprises a tube alignment means arranged at the lower flange for holding in an aligned manner, the tube end in the sealing section.

Concerning the directions and positions of upper, lower, axial, circumferential, inner, outer and radial as indicated for describing the invention, an upper and lower direction is to be understood as running parallel to the axial direction of the gel sealing device which corresponds substantially to the extension direction of the elongate parts, wherein the lower direction directs to a lower side of the gel sealing device, which refers to an incoming side of the tube, and wherein the upper direction directs to the opposite side, that is, the side to which the elongate part guided by the tube extends. Further, in the sense of the present invention, a circumferential direction refers to the direction running around the longitudinal axis of the gel sealing device, whereas an inner direction and an inner side or a radial inner direction and a radial inner side relate to the direction running perpendicular to and towards the longitudinal axis. The outer direction (radial outer direction) and outer side (radial outer side) direct to the opposed direction of the inner direction and inner side, respectively. This explanation shall not be understood as limiting the cross sectional shape of the gel sealing device to round configuration. Oval, triangular, rectangular or polygonal cross sections are also feasible.

More preferable, the tube alignment means comprise at least two opposing lips forming a tube channel therebetween for axially guiding the tube to be introduced, wherein said tube channel has an opening with an inner diameter adapted to closely fit at least part of an outer circumference of the tube in a tube receiving state to secure the tube at least in a radial or circumferential direction of the gel sealing device. The tube receiving state corresponds to a state in which the tube is installed in the gel sealing device, particularly in the tube alignment means. For facilitating the close fit, the opening preferably has at least two tube guiding portions extending by a predetermined length in axial direction of the tube, i.e. extending in parallel width the direction of extension of the tube, and coming into contact with the outer circumference of the tube over its axial extension length, wherein the tube guiding portions preferably oppose each other. In case of two guiding portions, each can be provided with one lip. By increasing the number of tube guiding portions, said tube guiding portions can be preferably arranged equally space apart in circumferential direction of the opening. Thereby, the tube can be retained at least in radial or circumferential direction of the gel sealing device. By preferably increasing the contact area between the tube guiding portions and the tube in its received state, the tube can be likewise axially retained due to a frictional force acting between the tube guiding portion and the tube in its received state. More preferable, the opposing lips form an opening adapted to completely surround and contact the outer circumference of the tube.

In a further preferred embodiment, each of the lips has a conical half-shell shape, wherein the opposing lips form a conical tube channel therebetween with a small diameter side having the opening and facing the sealing section. Preferably, the opposing lips extend in the area between the gel outer ring and the gel inner ring. In other words, the opposing lips protrude in axial direction from an upper side of the lower flange towards the sealing section and are completely covered by a lower axial end side of the gel outer ring and the gel inner ring. Accordingly, the gel inner ring and the gel outer ring adopt the shape of an outer circumference of the opposing lips, respectively; thereby completely covering said opposing lips by forming sealing lips having the adopted shape, which seal the tube channel at least at its upper axial end side.

According to a further preferred embodiment of the present invention, the gel sealing device comprises an elongate parts guiding means arranged at the upper flange, wherein said elongate parts guiding means comprises two opposing guiding lips forming a channel therebetween for guiding the elongate part in axial direction, wherein said channel has an opening with an inner diameter adapted to closely fit the part of a outer circumference of the elongate part in an elongate part receiving state in order to secure the elongate part at least in a radial or circumferential direction of the gel sealing device. Preferably, the guiding lips of the elongate part guiding means can be formed similarly to the lips of the tube alignment means, whereby same effects can be achieved. Thus, in a further preferred embodiment, each of the guiding lips has a conical half-shell shape, wherein the opposing guiding lips form a conical cable channel therebetween with a small diameter side having the opening and facing the sealing section.

In a further preferred embodiment, the elongate part guiding means and the tube guiding means are axially aligned with respect to each other, wherein the elongate part guiding means is arranged at the upper first ring segment and is adapted to receive the elongate part guided by the tube. According thereto, as the elongate part guided by the tube has a smaller diameter than the tube, the opening formed between the opposing guiding lips of the elongate part guiding means has an inner diameter smaller than the inner diameter of the opening formed by the opposing lips of the tube alignment means. In general, the tube alignment means provides an opening for the tube with a diameter larger than the opening provided with the elongate part guiding means arranged in axial direction opposed to the tube alignment means. Thereto, the tube and the elongate part guided by the tube are axial aligned to each other, wherein a displacement of the elongate part with respect to the tube can be prevented. Thus, a risk of damage to the elongate part after leaving the tube end can be minimized.

In a further preferred embodiment, the gel sealing device comprises an elongate part guiding means arranged at the upper flange and an elongate part guiding means arranged at the lower flange for guiding another elongate part, which is an elongate part not guided by the tube, from the lower side of the gel sealing device to its upper side through the sealing section. Preferably, the elongate part can be formed of a main cable which is thereby guided through the sealing section of the gel sealing device. According thereto, in parallel to the tubes, the main cable extending towards the upper side of the gel sealing device can be guided and aligned in a similar manner as the tube, wherein the main cable has an outer jacket which preferably extends through the sealing section of the gel sealing device and being partially removed in an upper area of the gel sealing device to expose the respective elements to be spliced with the assigned elongate part constituted by a further cable guided by the tube.

According to another preferred embodiment, the tube alignment means comprises a tube support secured to the lower flange at a side opposing the gel sealing device, wherein said tube support has at least one tube retaining channel formed at a circumferential outer surface of the tube support and adapted to axially retain the tube in the gel sealing device. Preferably, the tube support is secured to the lower flange by latching means. The tube retaining channel extends in axial direction of the gel sealing device, i.e. in parallel to the direction of extension of the tube. Preferably, the tube retaining channel is axially aligned with the tube alignment means, that is, the tube retaining channel is axially aligned with the opening formed with the tube alignment means for guiding the tube therethrough. Moreover, the tube retaining channel is adapted and/or interacts with further means such, that the tube received in the tube retaining channel is at least axially fixed to the tube support. For instance, the tube retaining channel can comprise recesses for securing the tube in the tube retaining channel by means of a cable strap.

In a further preferred embodiment, the tube retaining channel is a U-shaped recess formed in the outer circumferential surface of the tube support and has at least a section with an inner diameter smaller than a outer diameter of the tube for clamping the tube therein. Hence, no further means are required for clamping the tube in the tube retaining channel of said tube support.

According to a further preferred embodiment, the tube alignment means comprises a tube clamp having a tube receiving section of a U-shape. Further, the tube retaining channel is formed of a U-shaped recess which has a first section with an inner diameter smaller than a second section arranged adjacently to the first section and being adapted to receive the tube clamp, wherein between the first and second sections, a change-over is formed which provides an abutment surface for the tube clamp in a direction transverse to the direction of extension of the tube retaining channel. In particular, the tube clamp having the U-shaped tube receiving section is adapted to be inserted into the tube retaining channel with its open side. The tube received by the tube clamp is then radially retained in the tube retaining channel. Further, the tube clamp has a width in the direction transverse to the extension direction of the tube receiving section larger than an inner diameter of the first section and smaller than an inner diameter of the second section in order to clamp the tube clamp in the second section. According thereto, the tube clamp is adapted to abut with its axially end side against the abutment surface formed by the change-over between the first and second sections of the tube retaining channel in the received state of the tube clamp. Further, the tube clamp is adapted to be secured onto the tube such, that an axial displacement between the tube clamp and the tube is prevented. Thus, the tube clamp holding the tube will axially retain the tube in the tube retaining channel, when the tube clamp with the tube is received by said tube retaining channel in its second section due to abutment of the axial end side of the tube clamp with the abutment surface formed by the change-over between the first and second sections.

In a further preferred embodiment, the tube support has a circumferential recess formed in a circumferential outer surface of a wall section defining the U-shaped recess, wherein said circumferential recess extends in circumferential direction of the tube support and is adapted to receive a side protrusion protruding laterally from the tube clamp. By interaction of said circumferential recess with the side protrusion in the received state thereof, an axial securing of the tube can be further improved.

According to a further preferred embodiment, the axial abutment surface comprises an axial recess extending in axial direction of the tube retaining channel and adapted to receive an axial protrusion provided with the tube clamp, wherein said axial protrusion protrudes from one end side of the tube clamp in a direction parallel to the direction of extension of the tube retaining channel. In the received state of the tube clamp in the tube retaining channel, the axial protrusion is received by the axial recess and will be held therein in radial and circumferential direction thereof. Further, by abutting the abutment surface of the change-over, the tube clamp and the tube are axially held, at least, in the abutment direction.

In a further preferred embodiment, the tube clamp has in axial direction of the U-shaped tube receiving section, a radial tube clamp securing section, which comprises two opposing wall sections formed in axial elongation of the opposed wall sections defining the journals of the U-shaped receiving section, wherein an engaging pawl protrudes from the opposing wall section in a circumferential direction. Further, the second section of the tube retaining channel has a recess for receiving said engaging pawl and for securing the tube clamp in its clamping state in radial direction of the tube support. Thereto, a further improved securing of the tube clamp and of the tube in radial and circumferential direction of the tube support can be achieved. Preferably, the engaging pawl is provided at the end side of the tube clamp which opposed the end side comprising the axial protrusion. Hence, after first inserting the axial protrusion in the assigned recess, and then clamping the engaging pawl into the respective recess, the tube clamp and tube are axially, radially and circumferentially retained in the tube retaining channel.

For facilitating a securing of the tube to the tube clamp in a received state in the tube retaining channel, the tube clamp preferably comprises a bridge section extending transverse to the U-shaped tube receiving section to elastically abut against the tube in radial inner direction of the tube support in the clamping state of the tube clamp. In other words, the tube clamp presses the tube to the radial inner side of the tube support in its received state, whereby a displacement of the tube with respect to the tube clamp in its received state can be prevented. Thus, the holding force acting between the tube support and the tube clamp can be transferred to the tube, whereby the tube is reliably retained in the tube retaining channel of the tube support.

According to another preferred embodiment, the tube supported is adapted to retain a cable not guided by the tube in a similar manner as the tube by providing a respective configuration as described above with respect to the cable to be retained. In other words, the tube support is likewise adapted to retain the main cable at least in axial direction of the gel sealing device.

BRIEF DESCRIPTION OF THE DRAWINGS

The present invention will now be described in further detail by referring to a preferred embodiment depicted in the accompanying drawings. In these drawings.

DETAILED DESCRIPTION

For the following description of the housing 1, it is to be understood that an upper direction is directed to the side of the lower housing body 3 to which the upper housing body 2 is connected, whereas a lower direction refers to the opposed side thereof. An inner direction relates to the direction pointing to the central axis of the tubular-shaped lower housing body 3, whereas an outer direction corresponds to a direction from the central axis of the lower housing body 3 up to its radial outer side. A circumferential direction refers to a direction running in parallel with the circumference about the central axis of the lower housing body 3. An axial direction refers to the direction running parallel with the middle axis of the lower housing body 3.

Figure 1A:
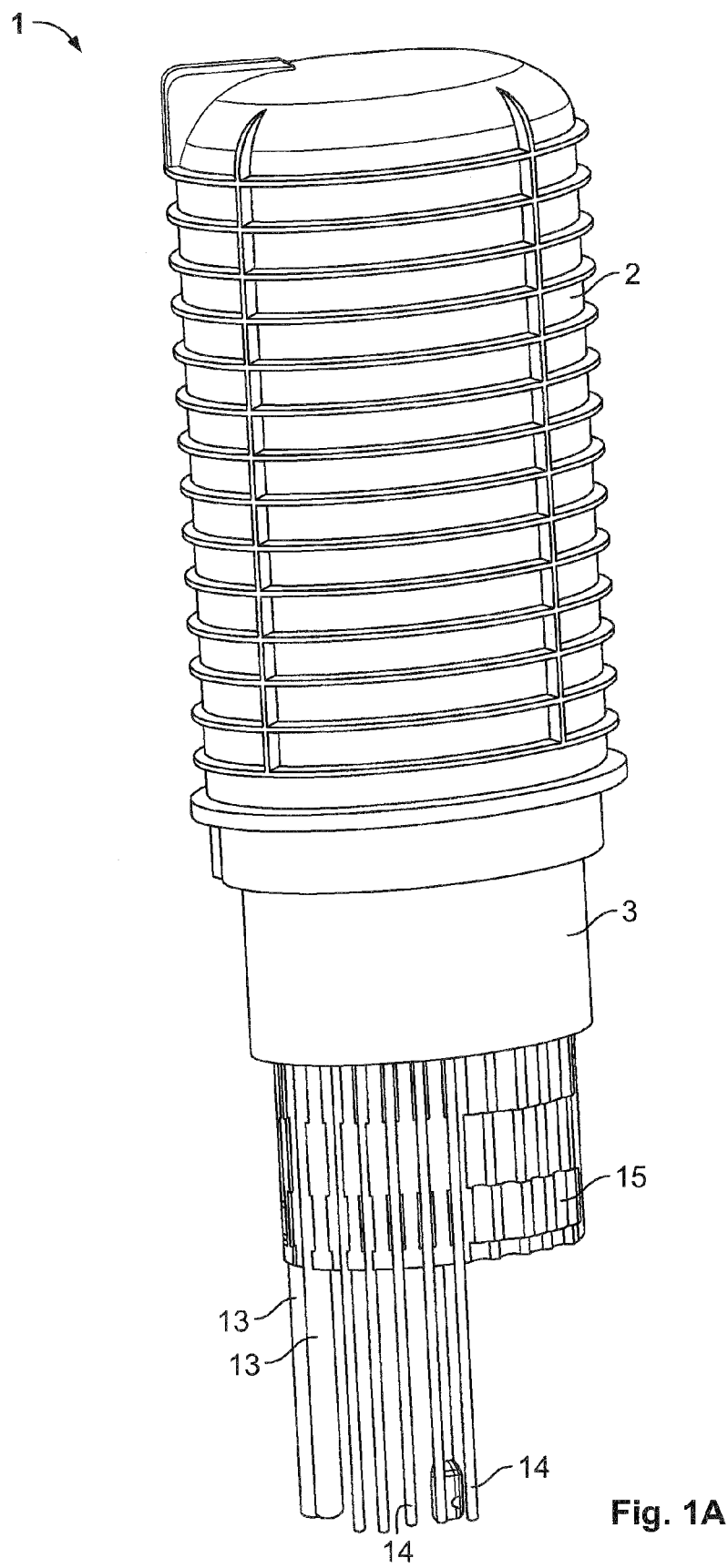
FIGS. 1A-1C show a perspective side view of a housing comprising a gel sealing device according to the embodiment in an assembled and disassembled state of upper and lower housing bodies.
Figure 1B:
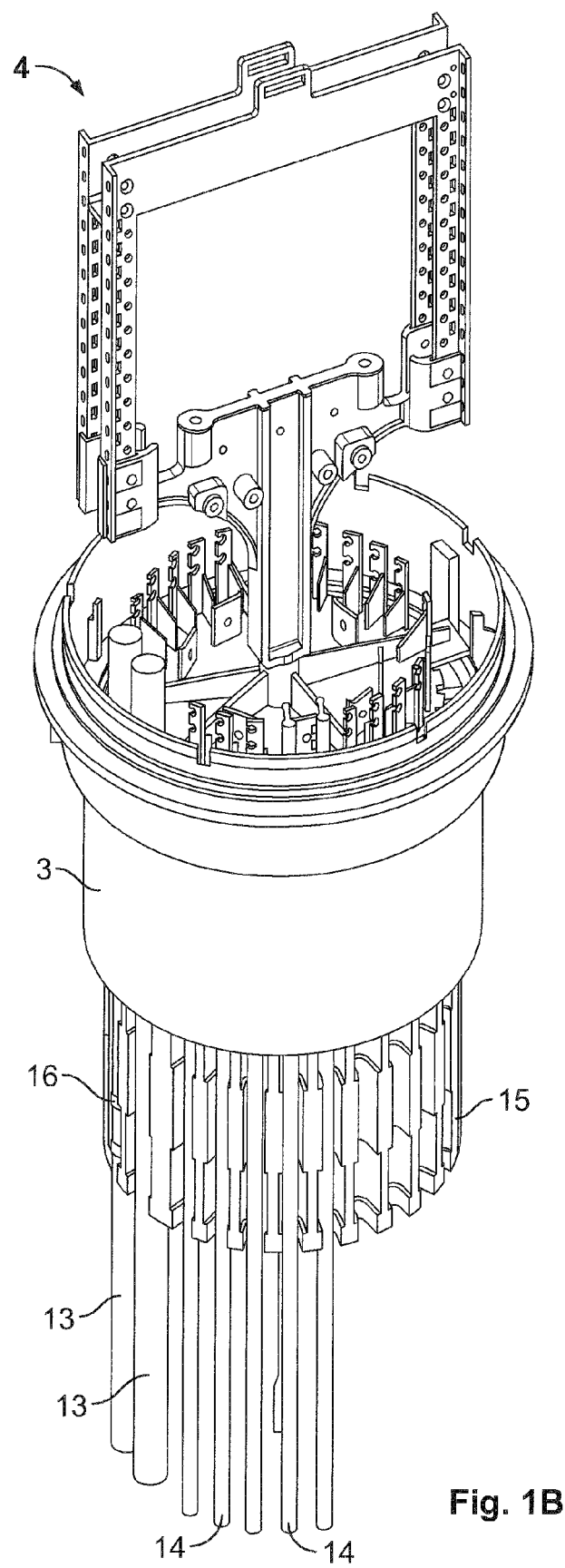
Figure 1C:
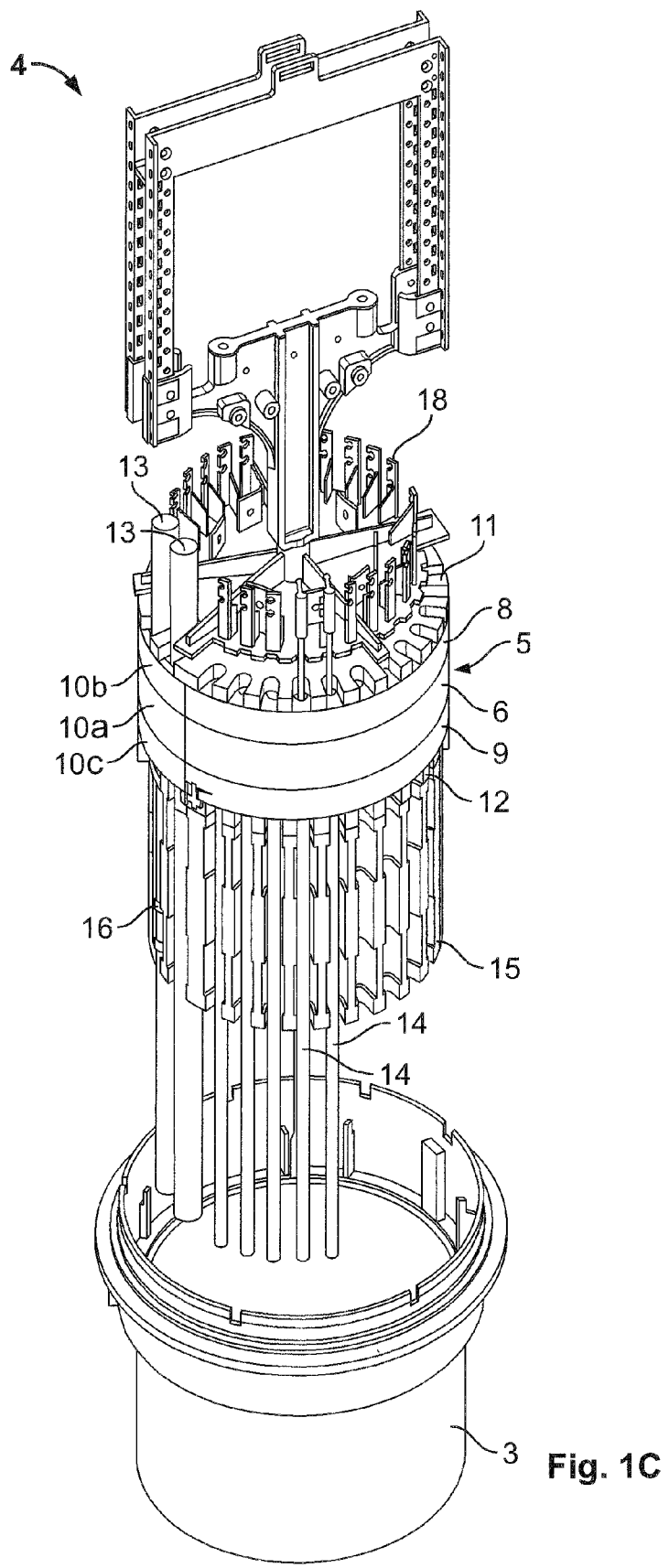

FIGS. 1A to 1C show a perspective side view of the housing 1 made by injection molding and comprising the lower housing body 3 of a tubular shape forming a passage for guiding the main cable 13 and a plurality of cables guided by a plurality of tubes 14 from the lower side to an upper side of the lower housing body 3. The upper side of the lower housing body 3 closed by the upper housing body 2 in the assembled state of the housing 1 defines a cable organizing area in which the plurality of cables, i.e. the main cable 13 and the plurality of cables guided by the tubes 14 are handleable. Said organizing area has a loop section holder 4 attached to a fixation member holder 18. As can be seen from FIG. 1C and particularly from FIG. 2, the housing 1 comprises a gel sealing device which is received and held in the passage of the lower housing body 3, wherein the fixation member holder 18 and the loop section holder 4 are arranged on the upper side of the gel sealing block 5. The loop section holder 4 provides a base for at least one loop section (not shown) to be attached to said loop section holder 4. The loop section is adapted to store an overlength of the assigned cable. The fixation member holder 18 has a disc-like shaped fixation member holder base 18a having a receiving portion 18f provided at the central portion for allowing attachment of the loop section holder 4 to the fixation member holder 18. The receiving portion 18f is formed of a protrusion extending in axial direction to the upper side and having a receiving hole adapted to receive a pin-like part of the loop section holder 4 provided at its lower end and having a polygon shape. The receiving hole of the receiving portion 18f has a corresponding shape at its inner circumferential side. Thereby, a rotational move of the loop section holder 4 in an assembled state with respect to the fixation member holder 18 is prevented.

Figure 2:
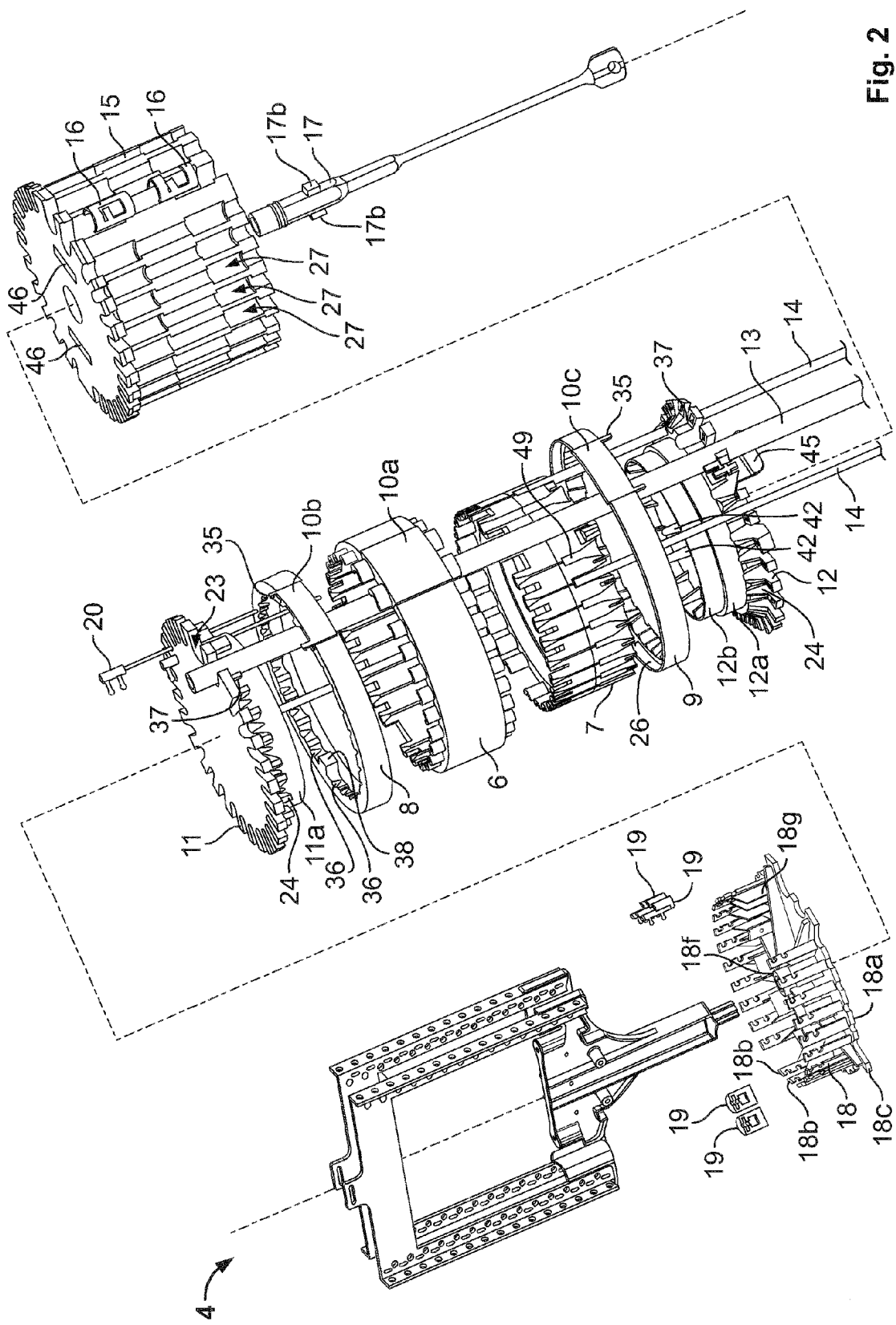
FIG. 2 shows an exploded perspective side view of the housing of FIGS. 1A to 1C without the upper and lower housing bodies.

As shown in FIG. 2, the fixation member holder 18 comprises a plurality of bar-shaped protrusions 18b extending in axial direction towards the upper side. Thereby, the fixation member holder 18 adopts a crown shape. Each bar-shaped protrusion 18b is adapted to hold a fixation member 19 which can be attached to an end side of a cable guided by the tube 14. In particular, said bar-shaped protrusion 18b comprises in axial direction two openings which communicate with an outside of the bar-shaped protrusion 18b by a recess extending from the opening to the circumferential edge of the bar-shaped protrusion 18b. The fixation members 19 have two pins adapted to be received by the openings of the bar-shaped protrusion 18b wherein said pins have at its free end side, a swelling part with an outer width larger than the middle section of the pin extending from the fixation member holder base 18a to the swelling part. The middle section of the fixation member 19 has an outer width being equal or smaller than the recess directing to the opening of the bar-shaped protrusion 18b. The fixation member 19 is inserted from the side of the bar-shaped protrusion 18b, i.e. the fixation member 19 is inserted into the openings of the bar-shaped protrusion 18b from the circumferential side. Thereby, the fixation member 19 is axially and radially fixed with respect to the fixation member holder 18.

On a radially inner side of the bar-shaped protrusion 18b, a reinforcing member 18g is provided which fixes the bar-shaped protrusion 18b to the upper surface side of the fixation member holder base 18a. Moreover, the fixation member holder 18 comprises a plurality elongations 18c extending between the bar-shaped protrusions 18b to the radial outer side, wherein the plurality of elongations 18c forms an outer circumference having a diameter larger than a diameter of the gel sealing device and smaller than an inner diameter of the lower housing body 3. The sections between the pluralities of elongations 18c form an inner circumference with a diameter smaller than the diameter of the gel sealing device. The plurality of elongations 18c is supported by an upper section of the lower housing body 3. In particular, the lower housing body 3 comprises in axial direction, a lower section and the upper section, wherein the upper section has an inner diameter larger than the lower section. Thereby, a step forming an abutment surface extending in radial direction of the lower housing body 3 is formed at the change-over between the upper section and the lower section of the lower housing body 3. The upper section of the lower housing body 3 comprises at its inner circumferential surface, a plurality of protrusions projecting radially from the inner circumferential surface by a length being equal to or smaller than a radial length of the abutment surface formed by the step. The plurality of protrusions projects further in axial direction at least until the upper edge of the upper section. The plurality of protrusions are arranged in such a manner that a plurality of recesses is formed therebetween which are adapted to axially receive the plurality of elongations 18c provided with the fixation member holder 18 from the upper side of the lower housing body 3. In an assembled state of the fixation member holder 18 within the lower housing body 3, a twist of the fixation member holder 18 with respect to the lower housing body 3 can be prevented thereby.

As it is evident from FIGS. 1A to 3B, the gel sealing device retained in the passage of the lower housing body 3 protrudes from the lower side of the lower housing body 3 by a predetermined length. As shown in FIG. 2, the gel sealing block 5 comprises an upper flange 11 and a lower flange 12 with a support section 11a, 12a disposed therebetween, wherein the upper and lower flanges 11, 12 sandwich in axial direction, a gel inner ring 7 and a gel outer ring 6, 10a covering the gel inner ring 7 in radial direction, wherein the gel inner ring 7 and the gel outer ring 6, 10a forms a sealing section therebetween. The gel sealing device further comprises at the lower side of the lower flange 12, a cable and tube alignment and supporting means 15 for guiding and holding the main cable 13 and the plurality of tubes 14 extending from the lower side of the lower housing body 3.

Figure 3A:
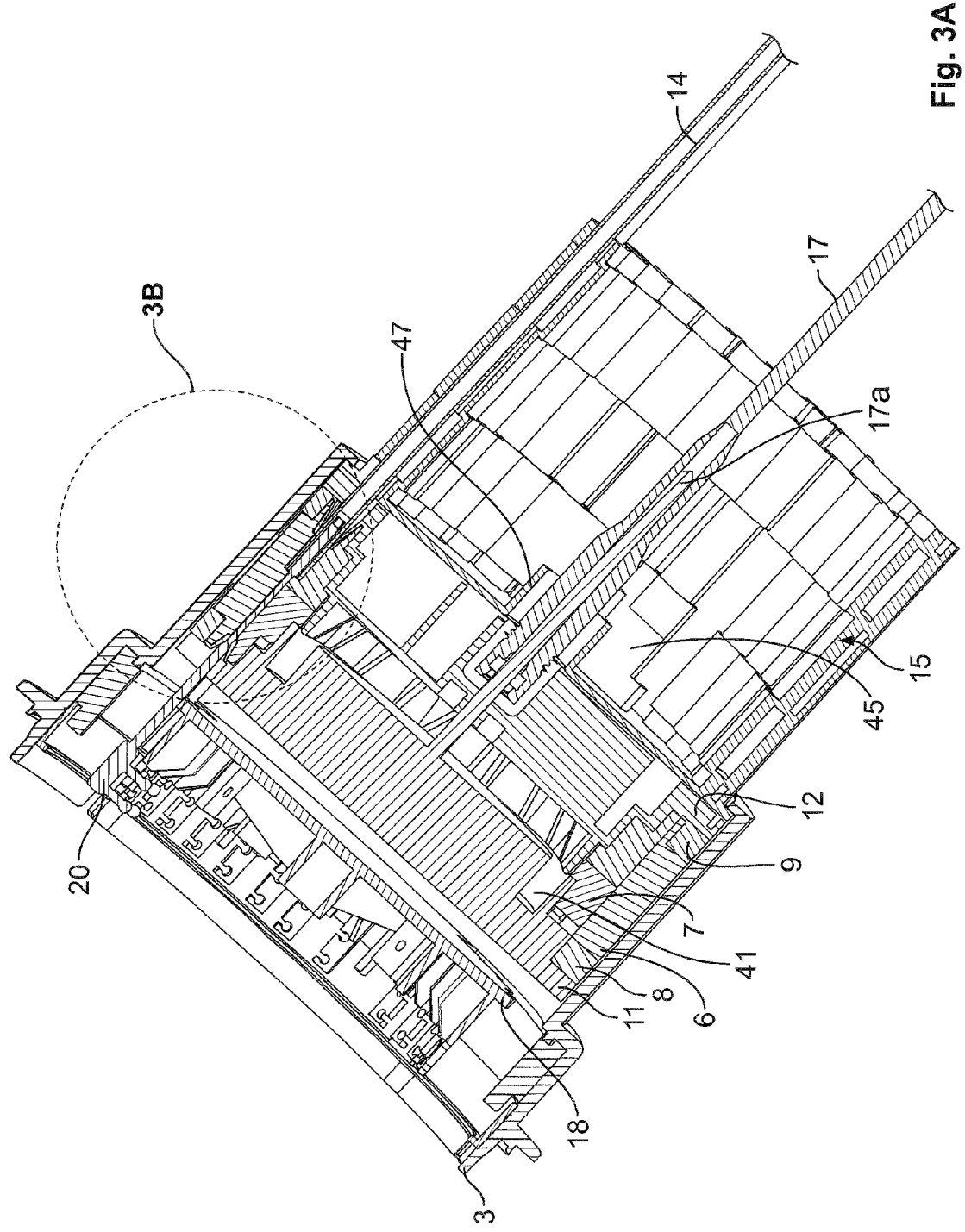
FIG. 3A shows a cross-sectional side view of the housing of FIG. 1B without the loop section holder.

As can be seen from FIGS. 2 to 3A, the upper flange 11 is disc-shaped and has at its outer circumference, a plurality of recesses providing a plurality of passageways 23 extending in axial direction. The upper flange 11 comprises at its lower side, a cylindrical round-shaped protrusion 11a having an outer diameter smaller than an inner diameter defined by the bottoms of the plurality of passageways 23. The round-shaped protrusion 11a projects from the lower side of the upper flange 11 toward the lower flange 12. The outer circumferential surface of the round-shaped protrusion 11a provides a first portion of the support section 11a, 12a, 12b formed between the upper and lower flanges 11, 12. The upper flange 11 comprises at its lower side, i.e. the side surrounded by the outer circumferential surface of the round-shaped protrusion 11a, a ring-shaped recess 41 and in the centre axis, a pin-like member 17a extending from the lower side of the upper flange 11 towards the lower flange 12 and towards the cable and tube alignment and supporting means 15. The ring-shaped recess 41 is adapted to receive a free-end side of a ring-shaped protrusion 12b provided with the lower flange 12. The recess 41 and the pin-like member 17a both extend in axial direction.

The lower flange 12 is disc-shaped and comprises a plurality of recesses at its outer circumference, forming a plurality of passageways 23 extending in axial direction. The lower flange 12 has at its upper side, a step formed round-shaped protrusion 12a, 12b projecting from the upper side of the lower flange 12 in axial direction. An outer diameter of the step formed round-shaped protrusion 12a, 12b is smaller than an inner diameter defined by the bottoms of the plurality of the passageways 23 formed in the outer circumference of the lower flange 12. The step formed round-shaped protrusions 12a, 12b has a first section 12a fixed to the upper side of the lower flange 12 and having an outer diameter larger than an outer diameter of the second section 12b projecting from an upper side of the first section 12a. The second section 12b is ring-shaped and is adapted to be received by the ring-shaped recess 41 provided with the upper flange 11. The outer circumferential surfaces of the step formed round shaped protrusions 12a, 12b form the remaining part of the support section 11a, 12a, 12b disposed between the upper flange 11 and the lower flange 12.

The lower flange 12 further comprises an opening at its central portion which guides therethrough the pin-like member 17a formed with the upper flange 11. The lower flange 12 comprises on its upper side in the area between the ring-shaped, second section 12b, several pin-like protrusions 42 projecting from the other side of the lower flange 12 in axial direction. Said pin-like protrusions 42 cooperate with thereto associated recesses formed in the lower side of the upper flange 11 in a radial inner area defined by the ring-shaped recess 41. In particular, the pin-like protrusions 42 are received by the corresponding recesses provided with the upper flange 11 in an assembled state of the gel sealing block 5, whereby said recesses and the pin-like protrusions 42 form a twist-preventing means preventing a twist of the upper flange 11 with respect to the lower flange 12 in said assembled state. Further, the lower flange 12 and the upper flange 11 are movable with respect to each other, wherein the ring-shaped second section 12b is fitted into the ring-shaped recess 41 of the upper flange 11.

The upper flange 11 and the lower flange 12 have each at their opposing sides, in axial elongation of the passageways 23, protruding lips 24, 28 for guiding and aligning the cable and tube into and out of the sealing section 22 formed between the gel inner ring 7 and the gel outer ring 6, 10a. As said lips 24, 28 are substantially identically shaped, the lips 24 provided with the lower flange 12 will be described in detail in the following, wherein the described configuration of said lips 24 also applies basically in a corresponding manner to the lips 28 formed with the upper flange 11.

Figure 3B:
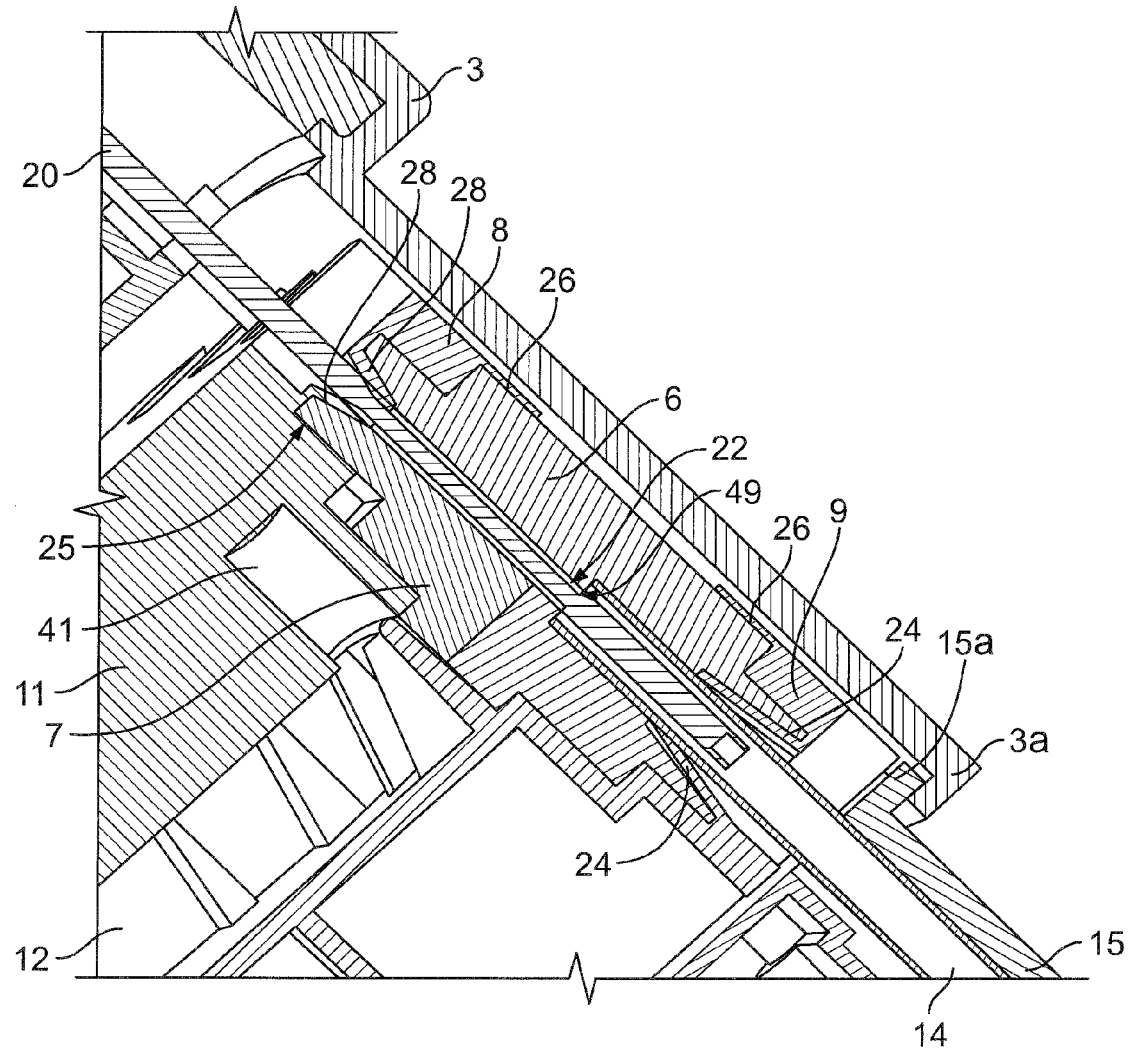
FIG. 3B shows an enlarged view of section IIIB of FIG. 3A.

As shown in FIGS. 2 to 3B, the lower flange 12 comprises directly adjacent to the passageway 23 in axial elongation thereof, at its upper side, the conical half-shell shaped lips 24 having a large diameter lower side fixed to the lower flange 12 and a small diameter upper side denoting a free-end side. The opening diameter of said small diameter upper side corresponds to an outer diameter of the tube 14 guided by said lip 24. The conical half-shell shaped lip 28 formed with the upper flange 11 has a small diameter lower side with an opening diameter corresponding to an outer diameter of the cable guided through the tube 14, which ends in the sealing section 22. Further, the lower flange 12 provides on a radial inner side of the conical half-shell shaped lip 24, a recess for receiving the gel sealing material of the gel inner ring 7 in an assembled state of the gel sealing block 5. Thereby, the conical half-shell shaped lip 24 is surrounded by the gel sealing material of the gel inner ring 7 at last in the assembled state of the gel sealing block 5, wherein the gel inner ring 7 forms at its axial end side sealing lips. The lower flange 12 further provides between adjacent conical half-shell shaped lips 24, a support surface for radially supporting a lower ring 9, 10c. In other words, the lower flange 12 comprises in axial elongation of the wall sections defining the passageway 23, an axial protrusion forming a radial support surface which extends from a radial surface of said wall sections to the upper side. The surface formed by the wall sections on the upper side of the lower flange 11 and extending to the radial outer side forms an axial support surface for the lower ring 9, 10c. Thus, the lower ring 9, 10c is supported by the lower flange 12 in axial and radial direction by the aforesaid support surfaces provided at the upper side of the wall sections defining the passageways 23. Furthermore, the lower flange 12 supports a lower axial end side of the gel inner ring 7 by the recesses formed in radial inner direction of the conical half-shell shaped lips 24, the large diameter side thereof are fixed to the wall sections defining the passageways 23. Whereas the axial lower end side of the gel outer ring 6, 10a, is supported by the lower ring 9, 10c.

Figure 4:
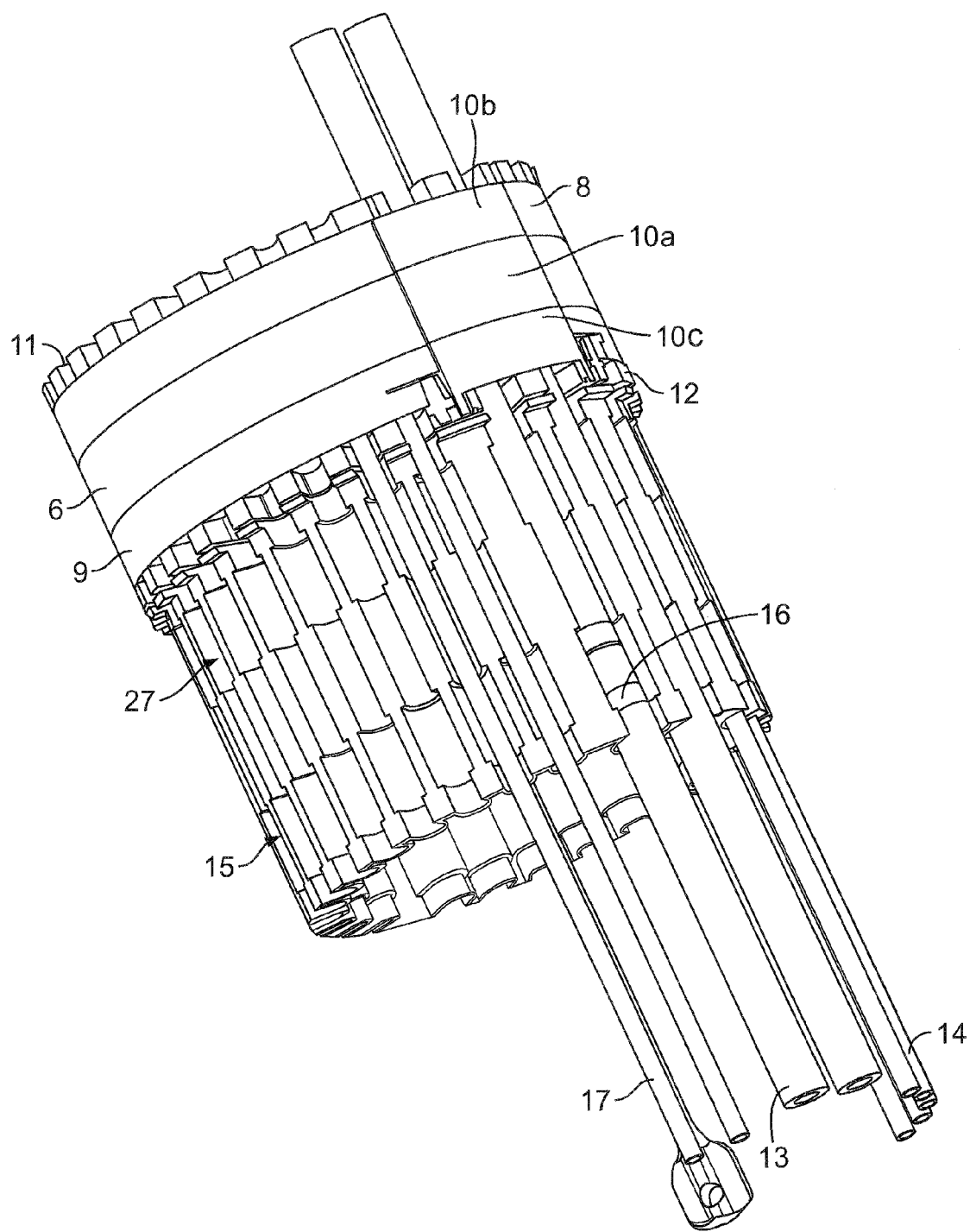
FIG. 4 shows a perspective side view of the gel sealing device of FIG. 2.
Figure 5:
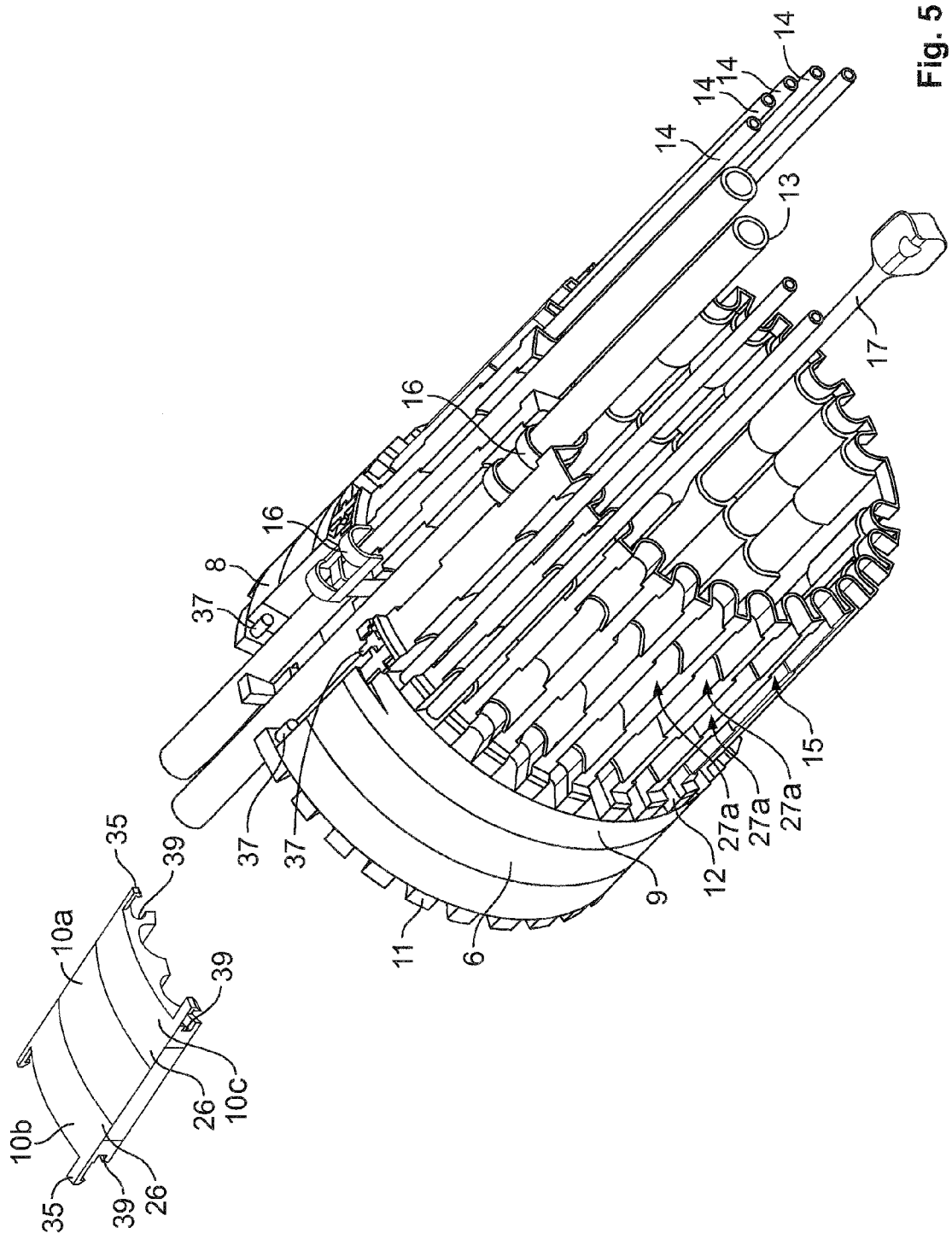
FIG. 5 shows a perspective side view of the gel sealing device of FIG. 4 with disassembled second circumferential segment.

As it is evident from FIGS. 2, 4 and 5, the gel inner ring 7 is formed of at least one ring extending continuously in circumferential direction and being supported by the support section 11a, 12a, 12b formed by the upper flange 11 and the lower flange 12, respectively. Whereas the gel outer ring 6, the lower ring 9, 10c and the upper ring 8, 10b are each comprised of two circumferential segments. In particular, the gel outer ring 6, 10a comprises a first circumferential segment 6 and a second circumferential segment 10a, which form in an assembled manner, the continuous gel outer ring 6, 10a. The first circumferential segment 6 is adapted to form with the gel inner ring 7, a sealing section 22 for the tube end of the plurality of tubes 14 guided by the passageway 23 and protruding lips 24 into the sealing section 22. The gel inner ring 7 and the first circumferential segment 6 of the gel outer ring 6, 10a form for each tube end in the sealing section 22 a termination 49 against which the axial end side of tube 14 abuts in its assembled state (FIGS. 2 and 3B). Particularly, each of the gel inner ring 7 and the first circumferential segment 6 provides a groove ranging from the lower flange 12 side into the sealing section 22, wherein the grooves of the gel inner ring 7 are aligned with thereto assigned grooves provided with the first circumferential segment 6. Respective assigned grooves form in an assembled state of the gel sealing device the termination 49 at their end side in the sealing section 22, wherein each groove is adapted to partially surround the received tube end, and wherein the termination 49 provides a central opening to guide there through the signal transmitting element protruding from the tube end at the termination 49 towards the upper flange 11.

The second circumferential segment 10a is adapted to form with the gel inner ring 7, a sealing section 22 at a position where the main cable 13 extends there through from the lower side to the upper side of the lower housing body 3. In compliance with the segmental configuration of the gel outer ring 6, 10a, the lower ring 9, 10c and the upper ring 8, 10b comprises each a first ring segment 10b, 10c and a second ring segment 8, 9, respectively. The first ring segment 10b, 10c and the second ring segment 8, 9 form in an assembled manner, the continuous upper ring 8, 10b and the continuous lower ring 9, 10c, respectively. Each of the upper ring 8, 10b and the lower ring 9, 10c, has on its inner circumferential side, a protruding lip pattern which corresponds in shape and configuration to the protruding lips 24, 28 provided with the upper flange 11 and the lower flange 12, respectively. Accordingly, the conical half-shell shaped lips 28 of the upper flange 11 and the upper ring 8, 10b and the lower flange 12 and the lower ring 9, 10c, respectively, form a conical channel with a free end side having an opening diameter adapted to guide therethrough, the main cable 13, the tube 14 and the cable guided through the tube 14, respectively (FIG. 3B).

The lower ring 9, 10c and the upper ring 8, 10b, further comprises a rim 26 extending at its outer circumference in axial direction towards the gel outer ring 6, 10a for covering and thereby radially supporting an outer circumferential surface of the axial upper and lower ends of the gel outer ring 6, 10a. Each of the upper and lower ring segments 8, 10b; 9, 10c is secured to the upper flange 11 and the lower flange 12, respectively. In particular, the upper and lower second ring segments 8, 9 comprises fixation and alignment means 37, 38, which are provided at circumferential end sections and at the circumferential middle section of the upper and lower second ring segment 8, 9, respectively. The fixation and alignment means 38 in the middle circumferential section constitutes a latching means comprised of a detent and latch, wherein the latch is formed with the upper and lower flange 11, 12, respectively and wherein the detent is formed with the upper and lower second ring segment 8, 9, respectively. Adjacent to the detent at both circumferential sides thereof, a hinge portion 36 made of a bend extending axially is provided for allowing a releasing of the part of the second ring segment 8, 9 extending from the hinge portion 36 to the circumferential end side from the gel sealing device in a secured state of the detent, i.e. of the second ring segment 8, 9.

The fixation and alignment means provided at each circumferential end side of the upper and lower second ring segments 8, 9, respectively, is comprised of a pin receiving hole which receives a pin 37 formed at the sides of the upper and lower flanges 11, 12 which opposes the upper and lower second ring segment 8, 9, respectively, and which is formed in axial elongation of the abutment surface of the wall sections defining the passageways 23. Thereby, the upper and lower second ring segments 8, 9 are securable to the upper and lower flanges 11, 12, respectively, by assembling the fixation and alignment means in axial direction.

Figure 6:
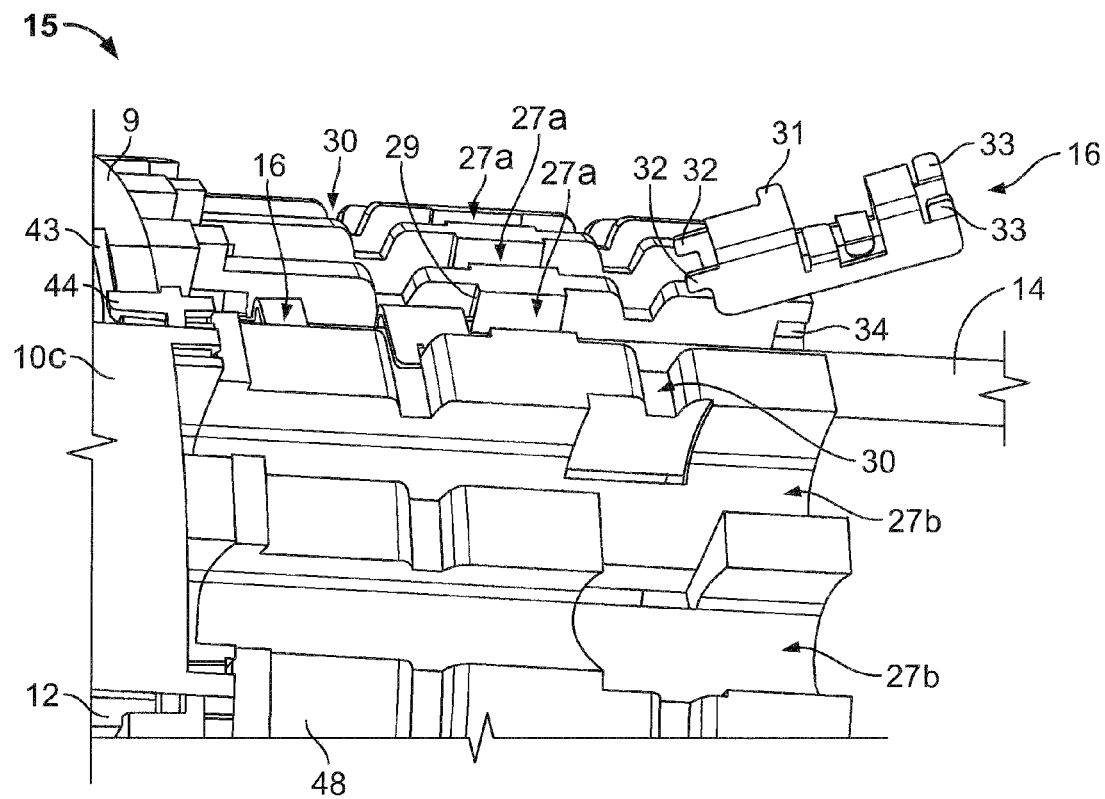
FIG. 6 shows a side view of the cable end tube alignment means.

Furthermore, the upper first ring segment 10b and the lower first ring segment 10c have an identical shape. Accordingly, in the following, the upper first ring segment 10b will be described in detail, wherein the described configuration of said upper first ring segment 10b, also applies to the lower first ring segment 10c. As shown in FIG. 5, the upper first ring segment 10b has a circumferential length corresponding to a circumferential length of the second circumferential segment 10a of the gel outer ring 6, 10a. Thus, the upper first ring segment 10b, the second circumferential segment 10a and the lower first ring segment 10c form in an assembled manner one part with common circumferential end sides extending in axial direction. The upper first ring segment 10b comprises at its radial inner side, two conical half-shell shaped lips which cooperate with the conical half-shell shaped lips 24 formed with the upper flange 11 to form a conical shaped cable channel for the main cable 13. The upper first ring segment 10b comprises further a rim section 26 covering radially, the upper axial end side of the second circumferential segment 10a. Moreover, the first ring segment 10b has two axial protrusions 35 at its upper side opposing the rim section 26, wherein said two axial protrusions 35 are disposed at the circumferential end sides of the upper first ring segment 10b, respectively, as an axial elongation of said circumferential end sides. Said two axial protrusions 35 form a detent with a hook portion at its free end side which grabs the upper flange 11 at the upper side thereof. The upper flange 11 provides at its outer circumference a groove extending in axial direction of the gel sealing device for receiving the detent in an embedded state (FIG. 6). The groove ends at the upper side of the upper flange 11 in a recess portion receiving the hook portion of the detent, wherein the detent ends at latest in a surface plane formed by the upper surface of the upper flange 11. Accordingly, said two axial protrusions 35 have an axial length equal to or smaller than a thickness of the wall section defining the passageway 23 in axial direction. The lower first ring segment 10b, further comprises radially inside with respect to said two axial protrusions 35 at or near the edges of circumferential end sides, a receiving hole 39 adapted to receive a pin 37 formed with the upper flange 11 in a manner corresponding to the pin 37 of the fixation and alignment means described with respect to the upper second ring segment 8. In particular, the pin 37 for securing the upper second ring segment 8 and the upper first ring segment 10b are formed adjacently and protruding from an identical wall section in axial direction (FIG. 5).

As shown in FIG. 6, the lower ring segment 9 comprises on its outer circumferential surface, in the region at the circumferential end sides, a groove 43 which cooperates with a detent 44, extending at a corresponding position from the lower flange 12 in axial direction. Said detent 44 is formed on the circumferential outer surface of the wall section defining the passageway 23 for the main cable 13, wherein said detent 44 is cross-shaped with a first part extending in axial direction forming the detent engaging the groove 43 and with a second part extending perpendicular to the aforesaid first part in axial direction and being fixed to the upper circumferential surface of the lower flange 12 for forming a pivot axis about which the detent 44 can be tilted to loosen the fixation of the lower second ring segment 9 to said detent 44.

As further shown in FIG. 2, the gel sealing device comprises a cable and tube alignment and supporting means 15 attached to the lower side of the lower flange 12. The lower flange 12 comprises latching means 45 axial protruding from the lower side of the lower flange 12 and being received by a recess 46 provided on the upper side of the cable and tube alignment and supporting means 15. The cable and tube alignment and supporting means 15 has a flat upper surface extending in radial direction and provided to abut against the lower surface of the lower flange 12. As can be seen from FIG. 3A, the cable and tube alignment and supporting means 15 has a central opening through which the pin-like member 17a of the upper flange 11 extends towards the lower side. Said pin-like member 17a is received by a rod 17 extending with one end, in axial direction through said central opening of the cable and tube alignment and supporting means 15 and hence, in the opening provided at the lower side of the lower flange 12. The rod 17 is adapted to retain the pin-like member 17a in order to move the upper flange 11 in axial direction. Particularly, the pin-like member 17a has a male screw thread at the free end side received by the rod 17, which has a female screw thread engaging said male screw thread. Thus, by rotational movement of the rod 17 in one circumferential direction, the upper flange 11 is moved towards the lower flange 12. By rotating the rod 17 in the opposite direction, the upper flange 11 is moved towards the upper side, i.e. in a direction opposing the lower flange 12. The rod 17 comprises at its free end side a hand-hold formed by two opposing wings and an opening extending in a direction transverse to the axial direction. Through said transverse opening, a further rod can be inserted to form a level by which an increased rotational force can be applied to reliable compress the gel inner ring 7 and the gel outer ring 6, 10a. Moreover, the rod 17 has in a region near the end which receives the pin-like member 17a, counter-pressure parts 17b abutting against a lower circumferential surface side of a protrusion extending from the lower side of the cable and tube alignment and supporting means 15 and surrounding the opening through which the pin-like member 17a received by the rod 17 extends. Said counter-pressure parts 17b are formed of short bar-shaped protrusions extending in radial direction from the rod 17 in opposing directions. Said bar-shaped protrusions 17b have a radial length larger than an inner diameter of the protrusion 46 extending from the lower side of the cable and tube alignment and supporting means 15. Said bar-shaped protrusions 17b abutting against said ring-shaped protrusion 47 in an assembled state of the gel sealing block 5 provides a counterpart to the axial pressured applied by the gel inner ring 7 and the gel outer ring 6, 10a in the compressed state to prevent a loosening of said compressed state.

The cable and tube alignment and supporting means 15 comprises at its outer circumferential surface, a plurality of cable and tube retaining channels 27a, 27b, each extending in axial direction in elongation of the passageway 23 formed with the lower flange 12. The configuration of the cable and tube retaining channels 27a, 27b will be described below with respect to FIGS. 6 and 7.

As is further evident from FIG. 3A, the cable and tube alignment and supporting means 15 comprises a flange portion 15a at its upper side for abutting against a flange 3a formed with the lower housing body 3 at its lower side. In particular, the upper side of the cable and tube alignment and supporting means 15 has an outer diameter corresponding substantially to the inner diameter of the lower section of the lower housing body 3, whereas the circumferential surface of the cable and tube alignment and supporting means 15 extending from said flange 15a to the lower side has an outer diameter being equal or smaller than an inner diameter formed by the lower flange 3a of the lower housing body 3. Accordingly, the gel sealing block 5 is supported by the lower housing body 3 in axial direction by the flange 3a formed at the lower side of the lower housing body 3. The outer diameter of the gel sealing device is equal or smaller than the inner diameter of the lower section of the lower housing body 3 without the flange 3a. Thus, the gel sealing block 5 is axially inserted into said lower housing body 3 from its upper side.

Figure 7:
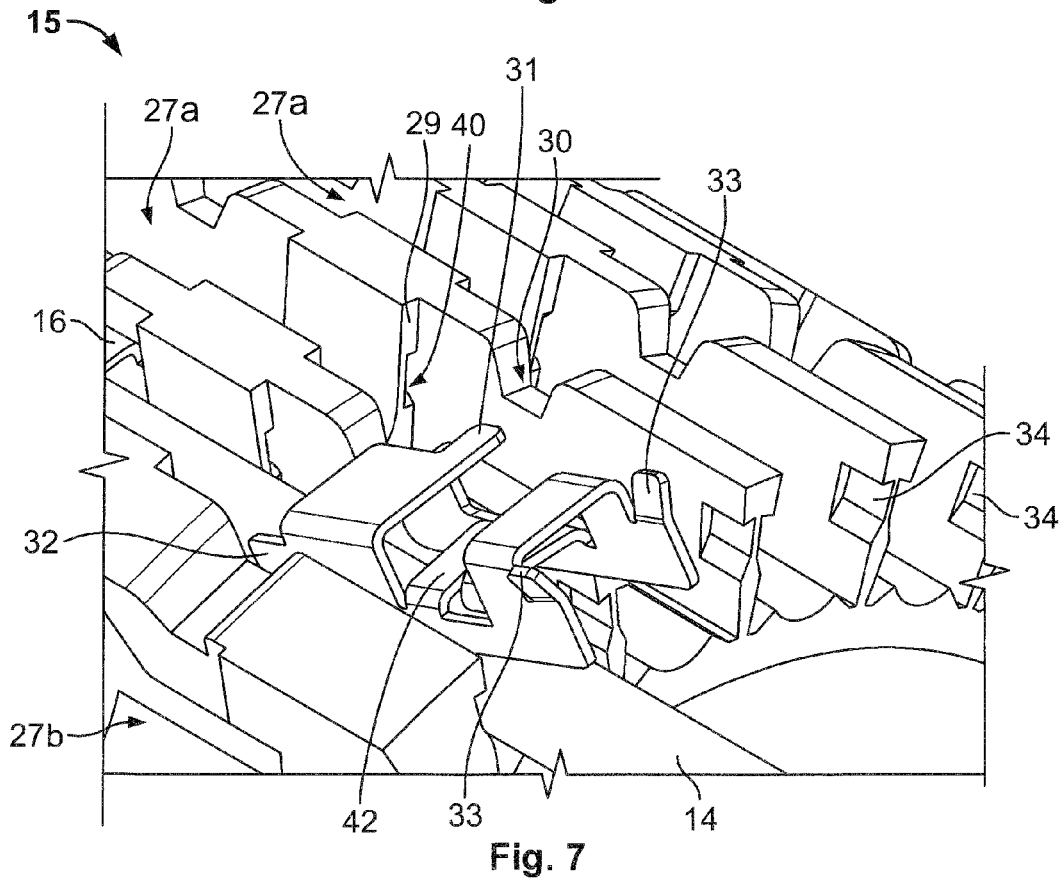
FIG. 7 shows a perspective rear-side view of the cable and tube alignment means of FIG. 6.

FIGS. 6 and 7 show a side view and a perspective rear side view of the cable and tube alignment and supporting means 15 attached to the lower housing body 3 by means of the flange 15a formed on the upper end of the cable and tube alignment and supporting means 15 and supporting the lower side of the lower flange 12. The cable and tube channels 27a, 27b extending in axial direction in elongation of the passageways 23 comprises a cable guiding channel 27b for guiding the main cable 13 in axial direction and a tube guiding channel 27a for guiding the tubes 14 in axial direction. The cable guiding channel 27b has recesses for fixing the main cable 13 to the cable and tube alignment and supporting means 15 by means of cable strap. The tube guiding channel 27a has in axial direction an upper section, a middle section and a lower section wherein the upper section is arranged adjacent to the lower flange 12 and wherein the lower section is provided at the lower side of the cable and tube alignment and supporting means 15. The middle section has in circumferential direction, a width smaller than the upper and lower sections. Thereby, a change-over formed between the middle section and the upper and lower sections, respectively, provides an abutment surface 29 extending in circumferential direction. Said abutment surface 29 comprises a recess portion 40 extending in axial direction (FIG. 7). The tube guiding channels 27a and the cable guiding channels 27b are each separated by wall sections 48 extending in axial direction. An outer circumferential surface of said wall sections 48 forms the outer circumferential surface of the cable and tube alignment and supporting means 15. The wall sections 48 comprise in an area of the upper and lower sections of the tube guiding channel 27a a recess 30 formed in circumferential direction over the circumferential width of said wall sections 48, respectively. The surface sides of the wall sections 48 defining the tube guiding channel 27a have in the region of the upper and lower sections of the tube guiding channel 27a in an area of the axial end sides, a vertical recess portion 34. Said vertical recess portion 34 provides at its outer side and at its axial end side, which is near the middle section of the tube guiding channel 27a, counter-surfaces adapted to prevent an axial and radial displacement of an element abutting against said counter-surfaces, respectively. As particularly shown in FIG. 7, the tube guiding channel 27a has an undulated bottom surface formed of two wave crests extending in axial direction in compliance with the direction of extension of the tube guiding channel 27a. The middle wave trough formed between the two wave crests is adapted to guide the tube 14 in axial direction and has a shape corresponding to the shape of the part of the tube 14 placed therein and guided thereby.

FIGS. 6 and 7 further show a tube clamp 16 of a sliding carriage shape. In particular, the tube clamp 16 has two cross-sectional U-shaped tube receiving sections with a middle recess section disposed there between. The middle recess section is formed by elongated journals of the U-shaped tube receiving sections, wherein the U-shaped tube receiving sections and the middle recess section provide at both circumferential sides of the tube clamp 16, a common surface side. The middle recess section constituting a bridge section has two circumferential extending elastically lips each protruding from one circumferential side to the opposed circumferential side of the tube clamp 16. One circumferential extending elastically lip is fixed to one circumferential side of the tube clamp 16, wherein the other is fixed to the opposed side. The lips are adapted to expand to a radial outer side by mounting the tube clamp 16 onto the tube 14. Thus, the tube 14 inserted into the tube guiding channel 27a is pressed by said circumferential extending lips onto the bottom surface of the tube guiding channel 27a.

The tube clamp 16 has at one axial end side, two axial protrusions 32 protruding from the U-shaped receiving section in axial direction. Said axial protrusions 32 are adapted to be received by the recess 40 formed in the abutment surface 29 at the change-over between the middle section and the lower and upper sections of the tube guiding channel 27a. At the opposed axial end side of the tube clamp 16, a second recess portion is formed, which has two engaging pawls 33 extending from said recess portion in circumferential direction. Hence, said engaging pawls 33, if viewed from a rear side of the tube clamp 16 (see FIG. 7) extend from the elongated journals of the U-shaped tube receiving section. Said engaging pawls 33 are adapted to be received by the vertical recess portions 34 formed in the upper and lower sections of the tube guiding channel 27a. The tube clamp 16 further comprises a circumferential side protrusion 31 which extends from the U-shaped tube receiving section to the circumferential outer side of the tube clamp 16. Said circumferential side protrusion 31 is adapted to be received by the circumferential recess 30 formed on the outer circumferential surface side of the wall sections defining the tube guiding channels 27a. In addition, the tube clamp 16 has in radial inner direction with respect to the axial protrusion 32, a round-shaped edge between the front edge facing the abutment surface 29 and the radial inner edge on the bottom surface of the tube guiding channel 27a. The round shaped edge allows a tiltable insertion of the tube clamp 16 into the tube guiding channel 27a, wherein the axial protrusions 32 are first inserted into the assigned recesses 40 and then the engaging pawls 33 are clamped into the assigned vertical recesses 34.

By inserting at least one tube clamp 16 into the tube guiding channel 27a, the tube 14 is axially fixed at least in one axial direction by the abutment surface 29 cooperating with the front edge of the tube clamp 16 from which the axial protrusion 32 projects in combination with a cooperation of the vertical recess 34 receiving the engaging pawls 33. By inserting two identical tube clamps 16 in said tube guiding channel 27a in an opposed manner as shown in FIG. 6, the tube 14 is axially fixed along opposing axial directions. Furthermore, an axial fixation of the tube 14 in said tube guiding channel 27a, is further obtained by the cooperation of the circumferential side protrusion 31 received by the circumferential recess 30. The radial fixation of said tube 14 is achieved by the axial protrusion 32 inserted into the recess 40 and by the engaging pawls 33 received by the vertical recess portions 34.

Based on such fixation, the tube 14 can be reliably aligned and held with its tube end in the sealing section 22 provided between the gel inner ring 7 and the gel outer ring 6, 10a as shown in FIGS. 3A and 3B.

Figure 8:
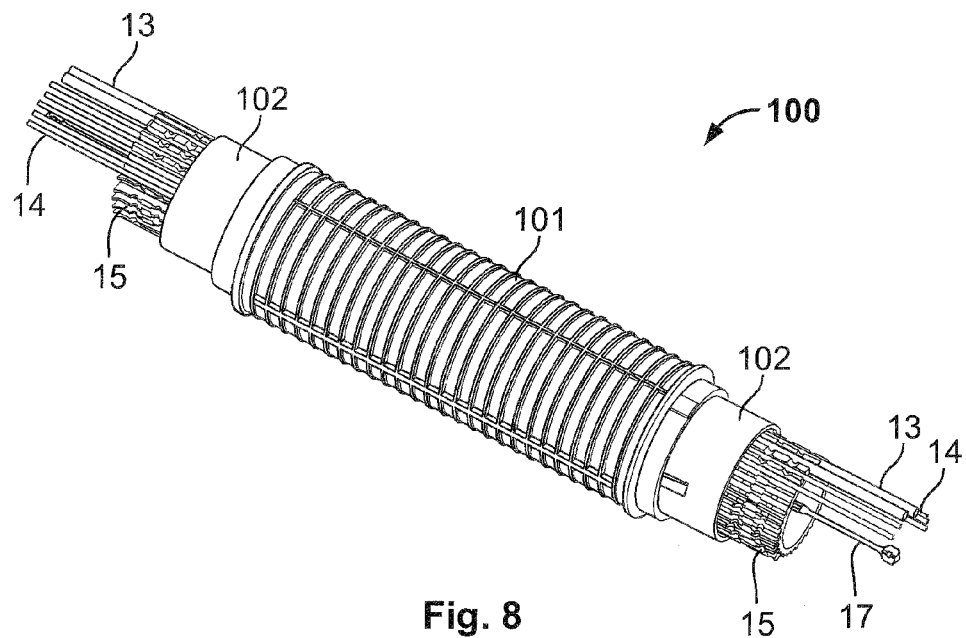
FIG. 8 shows a perspective side view of a further housing comprising the gel sealing device according to the embodiment in an assembled.
Figure 9:
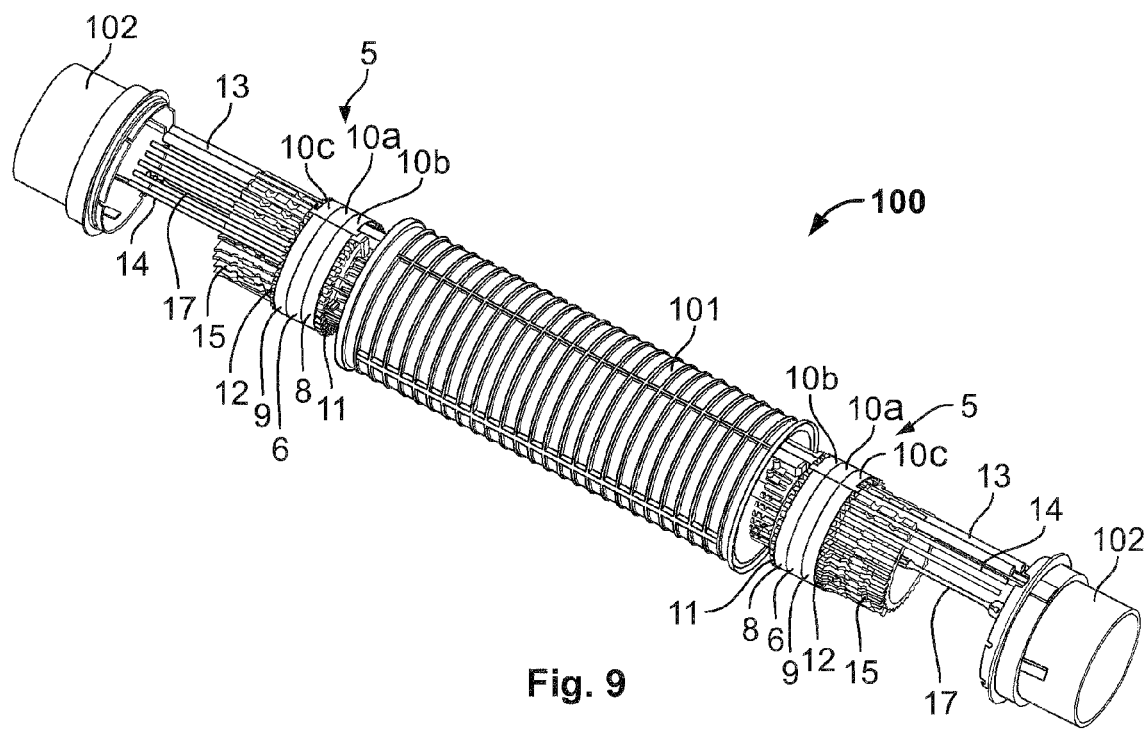
FIG. 9 shows an exploded perspective side view of the housing of FIG. 8.

FIGS. 8 and 9 show a further housing 100 receiving two gel sealing devices according to the preferred embodiment as described above. As a matter of course, the further housing 100 can be adapted to receive different gel sealing devices. Said further housing 100 comprises a tubular upper housing body 101 providing a common cable organizing area for the cables guided and sealed by the gel sealing devices, wherein said cable organizing area is provided between openings formed at the axial end sides of the upper housing body 101. Each axial end side of the upper housing body 101 is connectable to a lower housing body 102 in a similar manner as described with respect to the upper housing body 2 and the lower housing body 3 of the above-described housing 1. Particularly, the lower housing body 102 which receives the gel sealing device and the assigned end side of the upper housing body 101 are basically configured in a corresponding manner as the lower and upper housing bodies 3, 2 of the above housing 1, wherein the gel sealing device is retained in each lower housing body 102 in axial direction thereof.

A method of inserting the main cable 13 and the tubes 14 in the housing 1 according to the above preferred embodiment of the present invention will now be described. In case the housing 1 is pre-assembled as shown in FIG. 1A, the upper housing body 2 is removed from the lower housing body 3 which is then moved to the lower side to expose the gel sealing block 5. The main cable 13 and the tubes 14 to be installed in the gel sealing block 5 are inserted through the passage of the lower housing body 3. To facilitate the installation, the sealing section 22 provided between the gel inner ring 7 and the gel outer ring 6, 10a is accessibly exposed by a rotational movement of the rod 17 in one circumferential direction corresponding to the releasing direction, wherein the upper flange 11 moves to the upper side, i.e. away from the lower flange 12, thereby decompressing the gel inner ring 7 with respect to the gel outer ring 6, 10a. By said axial movement of the upper flange 11 away from the lower flange 12, the fixation of the upper and lower first ring segments 10b, 10c with the second circumferential segment 10a sandwiched therebetween is released. Particularly, the pin receiving hole 39 and the pin 37 are separated from each other. Thus, the upper and lower first ring segments 10b, 10c with the second circumferential segment 10a can be removed from the gel sealing block 5. Said release can be performed with or without releasing the upper and lower second ring segments 8, 9 sandwiching the first circumferential segment 6. Then, the main cable 13 is inserted from the radial outer side of the gel sealing block 5 into the passageway 23 and the cable guiding channel 27b provided with the upper flange 11, the lower flange 12 and the cable and tube alignment and supporting means 15. If necessary, the main cable 13 can be looped in the organizing area and guided back through the gel sealing block 5 to an outside of the housing 1. After insertion of the main cable 13 in the gel sealing block 5, the upper and lower first ring segments 10b, 10c with the second circumferential segment 10a are mounted onto the gel sealing block 5 by inserting the pin 37 into the pin receiving hole 39 and by moving the upper and lower flanges 11, 12 towards each other.

The insertion of the tube 14 can be performed in parallel with the insertion of the main cable 13 or separately thereto. Alternatively, or in addition to the release of the second circumferential segment 10a for exposing the sealing section 22, the upper and lower second ring segments 8, 9 with the first circumferential segment 6 sandwiched therebetween are hinged away from the gel sealing block 5 in a secured state of the upper and lower second ring segments 8, 9. The tube 14 is inserted from the radial outer side onto the gel sealing block 5 in such a manner that the tube end is placed in the groove onto the gel inner ring 7 in the sealing section 22. The tube end is aligned with respect to an inner end side of the groove forming with the assigned groove of the gel outer ring 6, 10a the termination 49. Further, the tube 14 is inserted in the tube guiding channel 27a and fixed thereto by tube clamps 16. In case the cable is not guided through the tube 14 toward the upper side of the gel sealing block 5, a cable dummy 20 can be introduced into said tube end from the axial upper side, wherein an upper part of the cable dummy 20 is held by the fixation member holder 18. Alternatively, the tube end can be closed by a tube end cap. In the event that a cable is guided through the tube 14 to the upper side of the gel sealing block 5, the cable is spliced with an assigned cable guided by the main cable 13, wherein the splicing is stored in the cable organizing area. If a splicing of the cable guided by the tube 14 should not be performed at this time of cable installation, the cable guided by the tube 14 can be fixed to a fixation member 19 which can be mounted on the fixation member holder 18. Thereby, if a splicing of said cable with the main cable 13 shall be performed at a later date, the upper housing body 2 merely needs to be removed from the housing 1 to provide an access to the free end of the cable held by the fixation member holder 18.

After performing the insertion of the cable 13 and/or the tube 14, the sealing sections comprising the cable 13 and the tube 14 are sealed by assembling the respective circumferential segments 6, 10a to the gel sealing block 5. The rod 17 is turned in circumferential direction corresponding to a mounting direction, wherein the upper flange 11 moves towards the lower flange 12, for fixing the gel outer ring 6, 10a with the upper and lower rings 8, 10b; 9, 10c. Prior or subsequent thereto, the gel sealing device is inserted into the passage of the lower housing body 3. In case, the gel sealing device is inserted after rotating the rod 17, the rod 17 is further rotated in the mounting direction for further compressing the gel inner ring 7 and gel outer ring 6, 10a, such that the outer circumference of the gel outer ring 6, 10a is pressed against the inner circumference of the lower housing body 3 to obtain the sealing. Then, the fixation member holder 18 with the loop section holder 4 is installed on the upper section of the lower housing body 3 by rotationally aligning the fixation member holder 18 due to the elongated protrusions 18c formed with the fixation member holder 18 and the recesses provided at the inner circumferential side of the upper section of the lower housing body 3. Then, the rod 17 can be further rotated in the mounting direction in case of need for further compressing the gel inner ring 7 and the gel outer ring 6, 10a, thereby further pressing the gel sealing material in the radial outer direction towards the inner circumferential surface of the lower section of the lower housing body 3 for obtaining a reliable sealing. The upper housing body 2 is fixed to the lower housing body 3 at least after installing the loop section holder 4.

REFERENCE LIST 1, 100 housing
2, 101 upper housing body
3, 102 lower housing body
3a flange of the lower housing body
4 loop section holder
5 gel sealing block
6 first circumferential segment
7 gel inner ring
8 upper second ring segment
9 lower second ring segment
10a second circumferential segment
10b upper first ring segment
10c lower first ring segment
11 upper flange
11a round-shaped protrusion
12 lower flange
12a, 12b step formed round shaped protrusion
13 main cable
14 tube
15 cable and tube alignment and supporting means
15a flange of the cable and tube alignment and supporting means
16 tube clamp
17 rod
17a pin-like member
17b counter-pressure part
18 fixation member holder
18a fixation member holder base
18b bar-shaped protrusions
18c elongations
18f receiving portion
18g reinforcing member
19 fixation member
20 cable dummy
22 sealing section
23 passageway
24, 28 protruding lip
26 rim
27a tube guiding channel
27b cable guiding channel
30 circumferential recess
31 side protrusion
32 axial protrusion
33 circumferential protrusion
34 vertical recess
35 axial protrusion
36 hinge portion
37 pin
38 fixation and alignment means
39 pin receiving hole
40 recess portion
41 ring-shaped recess
42 pin-like protrusion
43 groove
44 detent
45 latching means
46 recess
47 ring-shaped protrusion
48 wall section
49 termination

The invention claimed is:

1. A gel sealing device for sealing elongate parts passing through tubes, wherein the gel sealing device comprises:
an upper flange;
a lower flange coupled to the upper flange to form a gel sealing block, the lower flange and the upper flange cooperating to define a support section;
a gel inner ring mounted radially over a portion of the support section;
a gel outer ring mounted radially over the gel inner ring, the gel inner ring and the gel outer ring being made of a gel sealing material and defining a sealing section therebetween for receiving the elongate parts, the sealing section including a first passage section and a second passage section, the first passage section transitioning to the second passage section at a termination surface that faces away from the upper flange, the second passage section being sized to receive an elongate part; and
a tube extending through the first passage section so that an axial end of the tube abuts against the termination surface to inhibit the tube from passing through the second passage section, the tube being configured to guide the elongate part to the second passage section.

2. The gel sealing device according to claim 1, wherein the gel sealing device comprises a tube alignment means arranged at the lower flange for holding in an aligned manner the axial end of the tube in the sealing section.

3. The gel sealing device according to claim 2, wherein the tube alignment means comprises at least two opposing lips forming a tube channel therebetween for axially guiding the tube to be introduced, wherein said tube channel has an opening with an inner diameter adapted to closely-fit at least a part of an outer circumference of the tube in a tube receiving state to secure the tube at least in a radial or circumferential direction of the gel sealing device.

4. The gel sealing device according to claim 3, wherein each of the lips has a conical half-shell shape, wherein the opposing lips form a conical tube channel therebetween with a small diameter side having the opening and facing the sealing section.

5. The gel sealing device according to claim 2, wherein the gel sealing block comprises an elongate part guiding means arranged at least at the upper flange, wherein said elongate part guiding means comprises two opposing guiding lips forming a channel therebetween for guiding the elongate part in an axial direction, wherein said channel has an opening with an inner diameter adapted to closely-fit a part of an outer circumference of the elongate part in an elongate part receiving state to secure the elongate part at least in a radial or circumferential direction of the gel sealing block.

6. The gel sealing device according to claim 5, wherein the elongate part guiding means and the tube guiding means are axially aligned with respect to each other, wherein the elongate part guiding means is adapted to receive the elongate part guided by the tube.

7. The gel sealing device according to claim 2, wherein the tube alignment means comprises a tube support secured to the lower flange at a side opposing the gel sealing block, wherein said tube support has at least one tube retaining channel formed at a circumferential outer surface of the tube support and adapted to axially retain the tube in the gel sealing block.

8. The gel sealing device according to claim 7, wherein the tube retaining channel is a U-shaped recess formed in the outer circumferential surface of the tube support and has at least a section with an inner diameter smaller than an outer diameter of the tube for clamping the tube therein.

9. The gel sealing device according to claim 7, wherein the tube alignment means comprises a tube clamp having a tube receiving section of a U-shape, and that the tube retaining channel is formed of a U-shaped recess which has a first section with an inner diameter smaller than a second section arranged adjacently to the first section and being adapted to receive the tube clamp, wherein between the first and second sections, a change-over is formed which provides an abutment surface for the tube clamp in a direction transverse to the direction of extension of the tube retaining channel.

10. The gel sealing device according to claim 9, wherein the tube support has a circumferential recess formed in a circumferential outer surface of a wall section defining the U-shaped recess, wherein said circumferential recess extends in a circumferential direction of the tube support and is adapted to receive a side protrusion protruding laterally from the tube clamp.

11. The gel sealing device according to claim 9, wherein the abutment surface comprises an axial recess extending in an axial direction of the tube retaining channel and adapted to receive an axial protrusion provided with the tube clamp, wherein said axial protrusion protrudes from one end side of the tube clamp in a direction parallel to the axial direction of the tube retaining channel.

12. The gel sealing device according to claim 9, wherein the tube clamp has in an axial direction of the U-shaped tube receiving section a radial tube clamp securing section, which comprises two opposing wall sections formed in axial elongation of the opposed wall sections defining the journals of the U-shaped tube receiving section, wherein an engaging pawl protrudes from the opposing wall sections in a circumferential direction, and that the second section of the tube retaining channel has a recess for receiving said engaging pawl and for securing the tube clamp in its clamping state in radial direction of the tube support.

13. The gel sealing device according to claim 12, wherein the engaging pawl is provided at an end side of the tube clamp which opposes an end side comprising an axial protrusion.

14. The gel sealing device according to claim 9, wherein the tube clamp comprises a bridge section extending transverse to the U-shaped tube receiving section to elastically abut against the tube in radial inner direction of the tube support in a clamping state of the tube clamp.

\* \* \* \* \*